United States Patent [19]

Harradine et al.

[11] Patent Number: 4,901,145

[45] Date of Patent: Feb. 13, 1990

[54] MOTION VECTOR ESTIMATION IN TELEVISION IMAGES

[75] Inventors: Vincent C. Harradine; Clive H. Gillard, both of Basingstoke, United Kingdom

[73] Assignee: Sony Corporation, Tokyo, Japan

[21] Appl. No.: 200,562

[22] Filed: May 31, 1988

[30] Foreign Application Priority Data

Jun. 9, 1987 [GB] United Kingdom ............ 8713456
Dec. 4, 1987 [GB] United Kingdom ............ 8728448

[51] Int. Cl.⁴ ............................................. H04N 7/01
[52] U.S. Cl. .................................. 358/105; 358/135;
358/136; 358/138; 358/140

[58] Field of Search ............... 358/140, 136, 105, 135, 358/138, 160

[56] References Cited

U.S. PATENT DOCUMENTS 4,733,298 3/1988 Koga ................................. 358/105
4,796,087 1/1989 Guichard ........................... 358/105
4,823,128 4/1989 Barak ................................ 341/118

Primary Examiner—Howard W. Britton
Attorney, Agent, or Firm—Alvin Sinderbrand

[57] ABSTRACT

Apparatus for motion vector estimation in a television image uses a block matching technique with successive refinement of the motion vector estimate. The apparatus comprises a vector filter and a vector calculator.

21 Claims, 14 Drawing Sheets

Fig. 4.
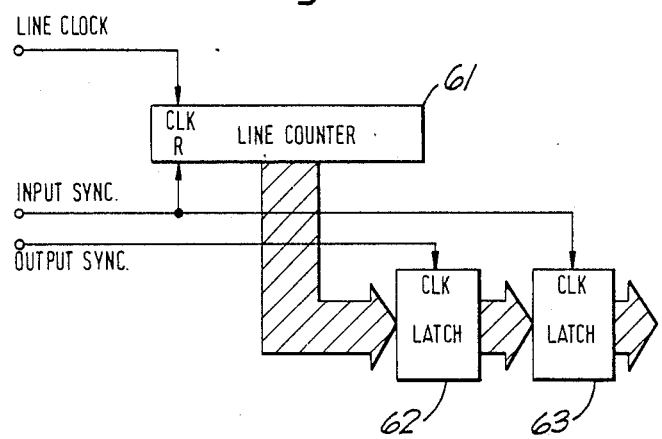
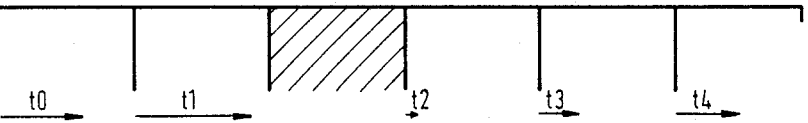
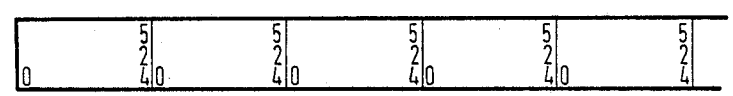
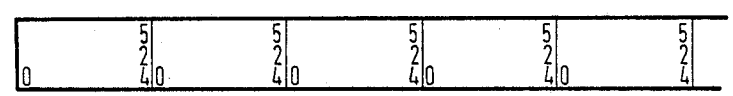
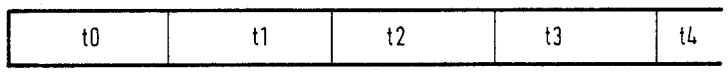
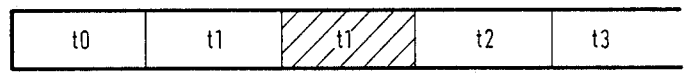

Fig. 6.
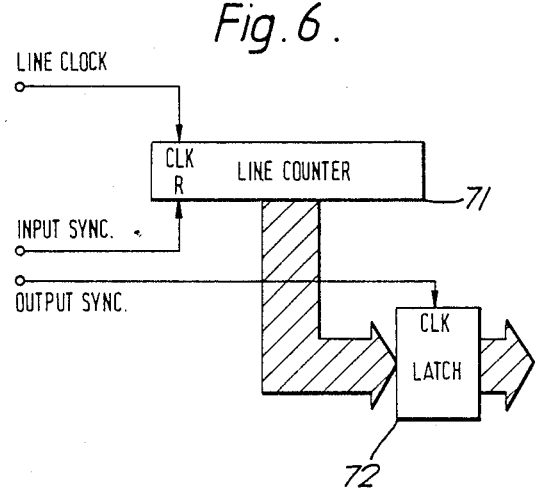
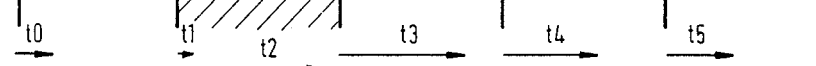
Fig. 7A.
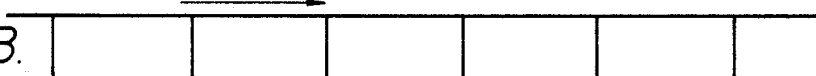
Fig. 7B.
Fig. 7C.
Fig. 7D.
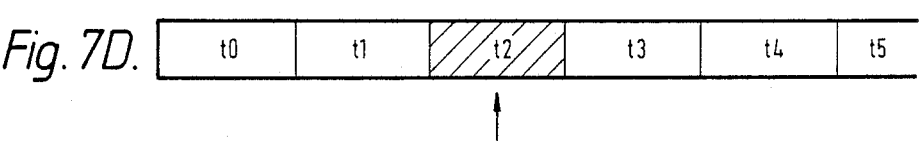

MOTION VECTOR ESTIMATION IN TELEVISION IMAGES

CROSS-REFERENCE TO RELATED APPLICATIONS

This application is related to the following applications for U.S. Letters Patent, each of which was filed concurrently herewith, that is, on May 31, 1988, and has a common assignee herewith:
Ser. No. 07/199,680
Ser. No. 07/199,681
Ser. No. 07/199,682
Ser. No. 07/199,683
Ser. No. 07/200,421
Ser. No. 07/200,503
Ser. No. 07/200,531.

BACKGROUND OF THE INVENTION

1. Field of the Invention

This invention relates to motion vector estimation in television images. Such motion vector estimation is particularly, but not exclusively, used in television standards converters and in slow motion processors.

2. Description of the Prior Art

International television program exchange necessitates standards converters due to the different television standards used in different countries, for example, the 625-line 50-fields per second (625/50) PAL system used in the U.K., and the 525-line 60-fields per second (525/60) NTSC system used in the U.S.A.

Many different standards converters have been previously proposed. One of the best known is the ACE (Advanced Conversion Equipment) developed by the British Broadcasting Corporation. Basically ACE operates on an input digital television signal line-by-line to derive interpolated samples required to form an output digital television signal. Interpolation is done not only spatially using four successive horizontal scan lines of the input television signal, but also temporally using four successive fields of the input television signal. Thus, each line of the output television signal is derived by multiplying respective samples from sixteen lines of the input television signal by respective weighting coefficients.

Further details of ACE will be found in U.K. patent specification No. GB-A-2 059 712 and in 'Four-field digital standards converter for the eighties' by R. N. Robinson and G. J. Cooper at Pages 11 to 13 of 'Television' (the journal of the Royal Television Society) for January/February 1982.

Although ACE gives good results, there is the problem that the equipment is very bulky. To overcome this problem, we have previously proposed a television standards converter comprising three field stores and four 4-line stores for receiving an input digital television signal of one standard and deriving therefrom arrays of sixteen lines, each array consisting of four successive lines from each of four successive fields of the input television signal. A weighting coefficient store stores sets of sixteen weighting coefficients, respective sets corresponding to positions both spatial and temporal of respective lines of an output digital television signal of a different standard, relative to the sixteen lines of the input television signal. Two interpolation filters then derive line by-line the output television signal by multiplying corresponding sample values from each of the sixteen lines of the input television signal by a respective weighting coefficient in a set of weighting coefficients and sum the resulting products to form an interpolated sample value, and four output field stores receive and store the derived lines of the output television signal. To store the additional lines which are derived when the output television signal has more lines than the input television signal, a 45-line store is interposed between one of the interpolation filters and the output field stores. Further details will be found in our U.K. patent specification No. GB-A-2 140 644.

The performance of such standards converters which employ vertical/temporal interpolation techniques represents a compromise between generating blurred pictures while maintaining good motion portrayal and maintaining vertical resolution but at the expense of 'judder'. The former is a result of post filtering in order to prevent disturbing alias effects; the latter is a result of the intrusion of the adjacent 2-dimensional repeat sample structures.

We have therefore proposed that motion vector estimation should be incorporated in television standards converters and in slow motion processors. The problem with the majority of existing motion vector estimation methods is that their use is biased towards video conference type applications where generally the subject matter is either a single person's head and shoulders or a small group of people seated around a table. With television images of this type the motion is relatively simple in comparison with broadcast television images where for example at a horse race meeting the camera could be following the leaders in a race. In this situation the motion would be complex, for example, because the camera would be panning. Thus, the background may well be moving at speeds greater than eight pixels per field, while in the foreground there would be at least one horse galloping. This means that the motion vector estimation method must try to track the horses legs, which may well be moving in different directions to that of the already moving background.

SUMMARY OF THE INVENTION

One object of the present invention is to provide an improved method of motion vector estimation in a television image.

Another object of the present invention is to provide an improved apparatus for motion vector estimation in a television image.

Another object of the present invention is to provide an improved television standards converter.

Another object of the present invention is to provide an improved slow motion processor.

According to the present invention there is provided a method of motion vector estimation in a television image using a block matching technique with successive refinement of the motion vector estimate.

According to the present invention there is also provided apparatus for motion vector estimation in a television image using a block matching technique with successive refinement of the motion vector estimate, the apparatus comprising a vector filter and a vector calculator.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 shows part of the standards converter of FIG. 3 in more detailed block diagrammatic form;

FIG. 5 shows time charts for explaining the operation of FIG. 4;

FIG. 6 shows part of the standards converter of FIG. 2 in more detailed block diagrammatic form;

FIG. 7 shows time charts for explaining the operation of FIG. 6;

DESCRIPTION OF THE PREFERRED EMBODIMENTS

In order more readily to understand the motion vector estimation which forms the subject of the present invention, the form and operation of two standards converters and a slow motion processor which use such motion vector estimation will first be described. The standards converters to be described maintain vertical resolution and remove the 'judder' by compensating for motion between fields. In effect the motion between consecutive fields is analyzed. These fields can then be 'aligned' pixel by pixel such that they represent static pictures upon which conversion can then take place. As a result, vertical resolution can be maintained.

The standards converters to be described can be divided into two parts. The first part is analogous to a known standards converter performing vertical/temporal interpolation to convert between 525/60 and 625/50 television standards. Alone, this would generate an output in which vertical resolution would be maintained but with the added effect of judder. To remove this judder four fields of the input digital television signal which are used in the conversion process are aligned under the control of motion vectors generated from a motion analyzer which forms the second part of the standards converter.

Figure 1:
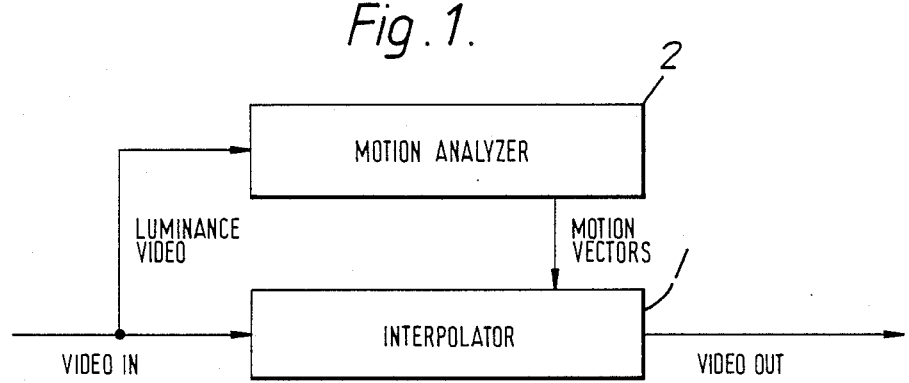
FIG. 1 shows in very simplified block diagrammatic form a television standards converter.

This is shown in very simplified diagrammatic block form in FIG. 1. The video portion of an input digital television signal of one standard, which may for example have been derived by sampling an analog television signal at 13.5 MHz, is supplied to an interpolator 1 from which the video portion of the required output television signal of a different standard is derived. A motion analyzer 2 receives the luminance video and derives motion vectors which provide data representing the motion between successive fields of the input television signal to control the operation of the interpolator 1. The interpolator 1 operates in a generally similar manner to the corresponding portion of a known standards converter, for example as referred to above. It also, however, contains the means to align the four fields used in the interpolation, under the control of the motion vectors.

The repositioning of the four fields is performed in two stages. The first stage involves varying the address of a variable delay element associated with each field to reposition the picture to the nearest line or sample. The second stage uses interpolation techniques both vertically and horizontally to reposition to within $\pm 1/16$ line or $\pm \frac{1}{8}$ of a sample. Even with no movement, both the above techniques are used to enable conversion of line standards.

The vertical interpolator has four taps per field allowing effectively an 8-tap vertical filter to be applied to the static pictures. An 8-tap interpolator allows good vertical resolution to be maintained with minimal distortion. The effect of distortion in the horizontal interpolator is less of a problem, so a 2-tap horizontal filter is used, although a 4-tap horizontal filter, for example, may be used.

The temporal interpolator is used in normal operation to enable interpolation of perspective changes or when no sensible motion vector can be detected, in which case the interpolator 1 must revert to normal standards conversion operation where no picture re-positioning occurs.

When converting from a high field rate to a lower rate, the incoming fields are interpolated such that an interpolated field can occasionally be dropped without any movement deterioration. All the interpolation is done at the input field rate and passed to a time base corrector which then spreads the fields generated over the required time period for the output standard.

The above operation is necessary when converting from 525/60 to 625/50. It is also evident however that 625 lines must be generated where only 525 lines exist in the input signal.

To overcome the line number conversion problem a second time base corrector is used at the input to produce a signal having 585 lines at the 60 Hz rate. A 585-line format can contain all the active picture information in the 625-line format. Following this first time base corrector there are occasional lines which have no video information. The interpolator stores are frozen during this time, so that an additional interpolated line can be generated from the same lines used to generate the previous output line. This process allows 625 lines to be interpolated from the original 525.

The reason for selecting the 585/60 format will now be explained in more detail. A 625-line picture contains 288 active lines in each field, and 720 samples in each horizontal line at the sampling rate of 13.5 MHz. The circuits, to be described below, of the television standards converters of FIGS. 2 and 3 use techniques which allow the picture to be shifted horizontally by plus or minus twenty-four samples. This requires a minimum horizontal blanking of forty-eight samples. The total number of sample positions required in a field is therefore:

(720+48)×288=221184.

There are clearly considerable advantages in using a 13.5 MHz clock throughout the system, in which case the number of clock cycles within a 60 Hz period (more exactly a 59.94 Hz period) is:

225225.

If 576 lines of data are required in one frame, the number of horizontal samples would be 782.03125. Although this number is sufficient to contain the required (720+48) samples, the fractional sample would mean that the structure was non-orthogonal on a line to line basis. This would cause significant design difficulties in the rest of the standards converter, so the number of lines required was gradually increased, from 576, until a whole number of samples, in fact 770, existed in each line.

The only format that achieves the orthogonal structure is the 585/60 format, which in addition gives a useful vertical blanking of four lines in the first field, five lines in the second field and fifty samples of horizontal blanking.

In the 625/50 to 625/50 slow motion mode referred to below there is no requirement to store the active video of the 625 format within a 60 Hz period, so the interpolation and other processing is done in the normal 625/50 format.

When converting from a low field rate to a higher rate the input time base corrector is required to produce a video stream at the output rate. This is done by occasionally repeating an input field. When the repeated field occurs, all the interpolator stores must be frozen so that the interpolation is applied to the same input fields used to create the previous output field.

If this technique were not used, two sets of interpolator and movement detector would be required to make up the missing field.

The above operation is performed when converting from 625/50 to 525/60. To allow 625 lines to exist during a 60-fields per second period again requires the 585/60 intermediate format to be adopted. During this process some of the interpolated lines will not be required, as only 525 have to be produced from the original 625. A time base converter is therefore required on the output to produce the final 525/60 format.

The amount of interpolation required is determined by comparing input and output synchronization pulse phases.

As mentioned above, motion analysis is performed on the luminance of the input video. The method employed involves a number of stages to arrive at a single motion vector for each pixel. Movement can be detected in the range ±24 pixels horizontally and ±8 (field rate) vertically.

In a first stage, motion in the picture at points on the screen spaced sixteen samples horizontally and eight lines vertically is determined using a block matching technique. The original motion vectors in a field are calculated every sixteenth sample and every eighth line. Each one of these points is at the centre of a search block. Conceptually each block is scanned ±24 samples horizontally, and +8 and −8 samples vertically over the next field each time generating the summation of the differences between the two fields over the area of the search block. The minimum overall difference then indicates in which direction the object at that point has moved.

In practice, the above technique is applied in separate steps which greatly reduces the amount and complexity of hardware required:

Step 1

Test for minimum difference in just three positions, centre position, sixteen samples to the left, sixteen samples to the right.

Step 2: Starting from point indicated above.

Test for minimum difference in nine positions symmetrically distributed about the above starting point in steps of eight samples or lines.

Step 3: Starting from point indicated above.

Test for minimum difference in nine positions symmetrically distributed about the above starting point in steps of four samples or lines.

Step 4: Starting from point indicated above.

Test for minimum difference in nine positions symmetrically distributed about the above starting point in steps of two samples or lines.

Step 5: Starting from point indicated above.

Test for minimum difference in nine positions symmetrically distributed about the above starting point in steps of one sample or line.

Step 6

After step 5, the motion of the object has been detected to the nearest pixel. A more accurate vector value can be achieved by adding a sixth step in which the difference produced at the final position indicated by step 5 is compared with the two differences above and below to adjust the vertical vector value and with the two differences to the left and right to adjust the horizontal vector value.

The above technique relies on achieving correlation between the reference search block and a similar block of video data on the following field (the search positions). In step 5 it is possible the true movement was a half pixel more or less than detected, but it is necessary for the best correlation to occur at this point, even although exact correlation cannot be achieved. To ensure this occurs, the picture can be filtered both vertically and horizontally by a gaussian filter which has +6 dB attenuation at ½ Nyquist frequency.

Similarly, for step 4, the picture can be filtered with a 6 dB attenuation at ¼ Nyquist frequency, which allows a one pixel error in detection.

Step 3 uses a picture filtered with a 6 dB attenuation at ⅛ Nyquist frequency allowing a two pixel error.

Step 2 uses a picture filtered with a 6 dB attenuation at 1/16 Nyquist frequency allowing a four pixel error.

Finally, step 1 uses a picture filtered with 6 dB attenuation at 1/32 Nyquist frequency allowing an eight pixel error. In addition, because the pictures are so heavily filtered during steps 1, 2, 3 and 4, the samples can be reduced, for example halved in number, which still further greatly reduces the number of calculations and amount of hardware required.

The effective search block size is sixteen lines high and forty-eight samples long. A large search block is necessary to detect accurately the movement of large plain areas. The central part of plain areas are unimportant as the values of the pixels at these points do not change from one field to the next, but the edges of such objects are obviously important. If the detection of motion is limited to ±24 samples horizontally and ±8 lines vertically then a block of the above size would be the minimum size to ensure accurate motion detection.

In the standards converters, depending upon the conversion modes, the luminance video entering the motion analyzer 2 is in various forms of 585-lines/60-fields per second. This might comprise repeated lines for 525 input or repeated fields for 625 input. In addition, the input contains both field polarities. The first process is to ensure a continuity of data and single field polarity for the motion estimation processing. This is done by interpolation on the input data by a vector interface to maintain continuity, and filtration horizontally to aid subsequent motion detection/correlation.

Separate outputs from this circuit are passed to motion estimation vector filters and motion detection field stores/vector selectors. The output of the vector interface is, as described above, spatially continuous, single field polarity data. The output to the field stores/vector selectors depends upon the input and output modes. In some modes it is continuous, and in others it contains repeated lines/fields. The vector filters and vector calculators perform the steps outlined above.

The processing of the various steps is performed by vector calculators and a vector processor. The vector calculators perform steps 1 to 5 and the vector processor performs step 6. In addition, the vector processor performs the second stage in the motion estimation, as follows:

For each 8×16 block a choice is made of four from seven motion vectors, the seven motion vectors being the one for that particular block and the six for the six nearest blocks respectively.

In addition, the vector processor also determines the four most common motion vectors throughout the whole input field, these being called modal motion vectors. The primary use of the modal motion vectors is in the border areas close to the edge of a field where it is not possible actually to calculate any local motion vectors. Also, if any one or more of the local motion vectors are equal, then these are substituted for by the modal motion vectors.

In the next stage of motion detection, for each pixel, the four motion vectors are tested by producing the difference between the extrapolated positions on field 0 to field 1. During standards conversion a field needs to be interpolated between two fields; say between field 0 and field 1. So the motion vectors generated between these two fields are considered to be most representative of the motion. Four motion vectors are used from these two fields. To decide which is the correct motion vector a pixel from field 0 is compared with a pixel from field 1 using the motion vector to decide where the pixel to be generated had come from on field 0 and where it has gone to by field 1. Mathematically, if the position x, y, z must be generated, where; x=horizontal position, y=vertical position, z=temporal position between field 0 and field 1, the pixels used for comparison are as shown below. Field 0 is assumed to be at z=0 and field 1 at z=1.

Pixel from field 0

$x^0 = x - (V_h * z)$ $y^0 = y - (V_v * z)$

Pixel from field 1

$x^1 = x + (1 - z)V_h$ $y^1 = y + (1 - z)V_v$

-continued $V_h$ = horizontal component of vector $V_v$ = vertical component of vector For each motion vector a modulus of the difference between the pixels indicated in field 0 and field 1 is found. The minimum difference is assumed, as a first estimate, to indicate the correct motion vector. If a number of motion vectors produce a very similar difference then these motion vectors are tested again using a comparison between fields −1 and 0.

Pixels from field −1

$x^{-1} = x - (1+z)V_h$ $y^{-1} = y - (1+z)V_v$

The minimum modulus of difference of the remaining vectors produced by this second test is then considered to represent most accurately the motion vector.

If a number of motion vectors again have similar differences then an option exists to assume no movement. If only the horizontal component varied and the vertical component did not, then only the horizontal component would be set to zero and the vertical component would be maintained at the detected value. If only the vertical component varied, then the horizontal component would be maintained and only the vertical component set to zero. If the pixel difference chosen is too large then an option exists to set the whole motion vector to zero in both directions.

A final stage is applied once every pixel has been assigned a motion vector. Here the motion of each pixel is tracked from one field to the next and a recursive filter applied to the motion vector value. This removes the effects of noise and small movement estimation errors and also smooths the trajectory of the motion vectors.

There are two possible ways of tracking the motion of a pixel.

In the first, the motion vector for a pixel in field t is used to point to a pixel in field (t+1). The motion vector determined for this pixel in field (t+1) is then recursively filtered to form the final motion vector for the pixel in field (t+1).

In the second, the motion vector for a given pixel in field t is used to point to a pixel in field (t−1). The motion vector from this pixel is then recursively filtered with the motion vector for the given pixel to form the final motion vector for this given pixel in field t.

In either case the final output is a motion vector for each pixel which is passed from the motion analyzer 2 to the interpolator 1 to be employed in aligning the four fields used in the standards conversion process.

Figure 2:
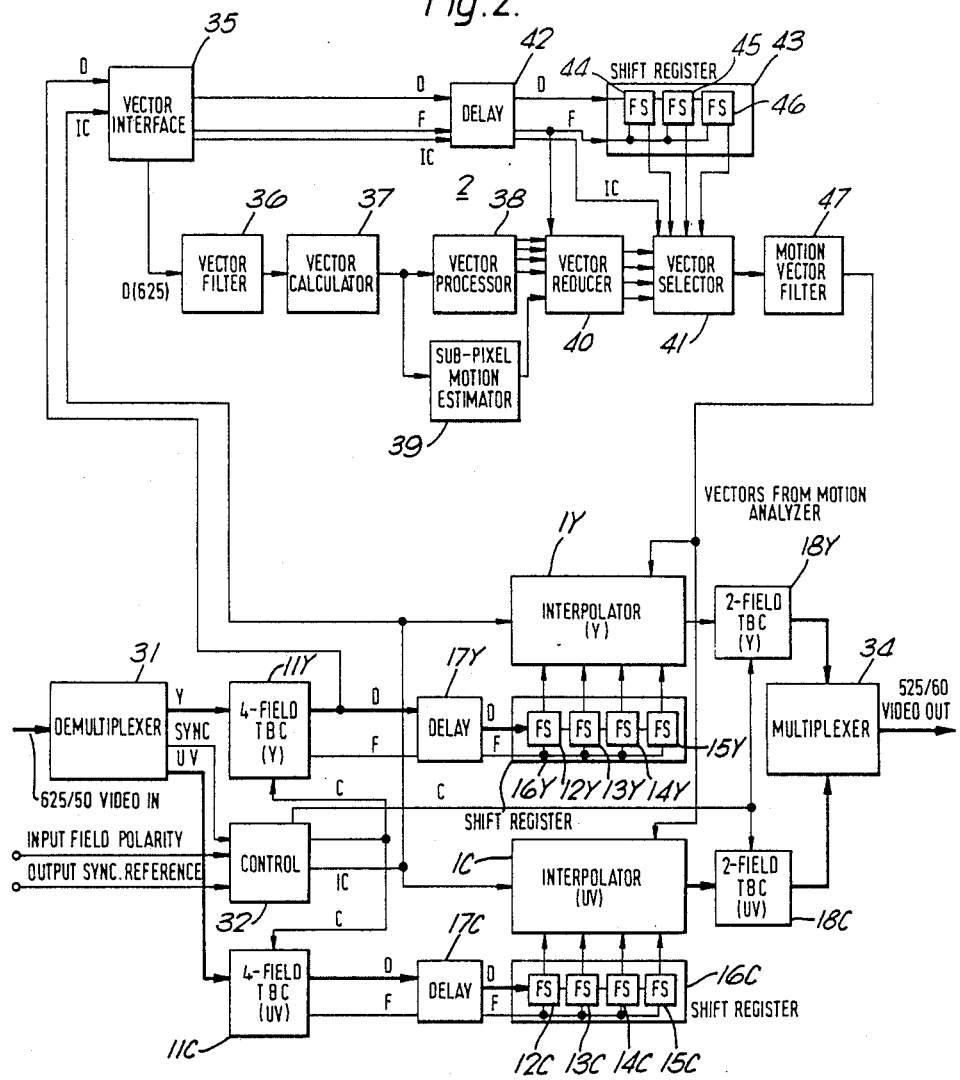
FIG. 2 shows in block diagrammatic form a first television standards converter.

The first standards converter for converting an input digital 625-line 50-fields per second television signal to an output digital 525-line 60-fields per second television signal is shown in detailed block form in FIG. 2.

The incoming video at 50-fields per second and a sample rate of 13.5 MHz, that is CCIR 601 data, is supplied to a demultiplexer 31 which separates it into luminance components Y, synchronizing signals SYNC and chrominance components UV. The luminance components Y are supplied to a 4-field luminance time-base corrector (TBC) 11Y and the chrominance components UV are supplied to a 4-field chrominance TBC 11C. The synchronizing signals SYNC are supplied to a control 32 together with an input field polarity signal from an external input, and an output field synchronizing reference signal from another external input. The TBCs 11Y and 11C occasionally repeat fields, so that the output is at 60-fields per second. The control to the TBCs 1Y and 11C which causes the repetition of a field is derived from the input field synchronization pulses, and the required output field synchronization pulses. The comparison of the synchronization pulses also provides a temporal offset figure which indicates the amount of temporal interpolation required at the outputs of the TBCs 11Y and 11C such that smooth motion at 60-fields per second would be observed.

When converting from 50-fields per second to 60-fields in this way a line conversion of 625 to 525 is necessary. It is therefore necessary to maintain the original 625 lines of information at a 60-fields per second rate so that they are all available to form the interpolated lines.

The standards converter uses an intermediate standard which is capable of containing all the active vertical information of the 50-fields per second signal at the 60-fields per second rate. The intermediate standard also contains all the active line information arranged orthogonally line by line still using the original 13.5 MHz sample rate.

The intermediate standard used, and which is as explained above capable of meeting all these requirements, is a 585-line format at 60-fields per second. When sampled at 13.5 MHz each line of this format has exactly 770 samples. It is clear therefore that 585 lines is sufficient to contain the 576 active lines of the 625-line format at a 60-fields per second rate. As the active line width is only 720 samples there is still fifty samples of horizontal blanking.

The luminance data (D) from the luminance TBC 11Y is supplied by way of a processing compensating delay 17Y to a luminance temporal shift register 16Y comprising four field stores (FS) 12Y, 13Y, 14Y and 15Y. The luminance TBC 11Y also supplies a temporal freeze signal (F) by way of the delay 17Y to the shift register 16Y. The chrominance TBC 11C supplies the chrominance data (D) by way of a processing compensating delay 17C to a chrominance temporal shift register 16C which comprises four field stores 12C, 13C, 14C and 15C. The chrominance TBC 11C also supplies a temporal freeze signal by way of the delay 17C to the shift register 16C. Associated with the shift register 16Y is a luminance interpolator 1Y which receives inputs from each of the field stores 12Y, 13Y, 14Y and 15Y, and derives the 585-line format. The output of the luminance interpolator 1Y is supplied to a 2-field luminance TBC 18Y. Associated with the shift register 16C is a chrominance interpolator 1C which receives inputs from each of the field stores 12C, 13C, 14C and 15C, and also derives the 585-line format. The output of the chrominance interpolator 1C is supplied to a 2-field chrominance TBC 18C. When the outputs of the TBCs 11Y and 11C are frozen, during a repeat field, the shift registers 16Y and 16C are also frozen, so that four distinct consecutive fields of the input always exist in the shift registers 16Y and 16C. Thus the shift registers 16Y and 16C are used to provide the temporal taps for the interpolators 1Y and 1C.

Each temporal tap produces four line taps at a position depending on the motion vectors, so that a 2-dimensional filter can be used to provide the necessary interpolation. The interpolated picture will contain 576 active lines, so that a correct picture will be obtained when every sixth line in one field is dropped. The 484 lines left produce the active picture portion of the 525-line format. To enable lines to be dropped in this way, the outputs from the interpolators 1Y and 1C are supplied to the 2-field TBC 18. The TBCs 18Y and 18C write in all 576/2 lines, but only read out the required 484/2 lines to provide the required output television signal. The outputs of the luminance TBC 18Y and of the chrominance TBC 18C are supplied to a multiplexer 34 which multiplexes the luminance components Y and the chrominance components UV to provide output CCIR 601 data in the form of a digital 525-line 60-fields per second television signal.

The control 32 supplies control signals (C) to the luminance TBC 11Y and to the chrominance TBC 11C. The control 32 also supplies control signals to the luminance TBC 18Y and the chrominance TBC 18C. It also supplies interpolation control signals (IC) to the luminance interpolator 1L and the chrominance interpolator 1C.

The luminance data only, as supplied by the luminance TBC 11Y, is also supplied to the motion analyzer 2 shown in the upper part of FIG. 2, so that motion vectors can be generated. In fact a frame delay is necessary between the TBCs 11Y and 11C and the shift registers 16Y and 16C to allow for the time taken to process the motion vectors. The freezing of the shift registers 16Y and 16C must therefore also be delayed by one frame, and these delays are provided by the delays 17Y and 17C.

The motion analyzer 2 comprises a vector interface 35 to which the luminance data from the luminance TBC 11Y is supplied, together with the interpolation control signal from the control 32. The vector interface 35 supplies data interpolated to 625 lines to a vector filter 36 and a vector calculator 37 which together perform the motion estimation described above. The output of the vector calculator 37 is supplied to a modal motion vector processor 38 and also to a sub-pixel motion estimator 39. The motion vector processor 38 supplies four outputs and the sub-pixel motion estimator one output to a motion vector reducer 40 which supplies four outputs to a vector selector 41.

The vector interface 35 also supplies the data interpolated to even fields to a processing compensating delay 42 to which it also supplies the received interpolation control signal, and also a temporal freeze signal (F) generated at the vector interface 35. The data from the delay 42 is supplied to a temporal shift register 43 which comprises three field stores 44, 45 and 46 which supply respective data outputs to the vector selector 41. The delay 42 supplies the interpolation control signal to the vector selector 41 which supplies the selected motion vector to a recursive motion vector filter 47, the output of which is the vector data which is supplied to the luminance interpolator 1Y and to the chrominance interpolator 1C.

The way in which the motion analyzer 2 derives the vector data has been described in detail above, and will be further described below, but the operation of the elements 35 to 43 and 47 will now be briefly described.

The vector interface 35 receives the luminance data from the luminance TBC 11Y, and the interpolation control signals from the control 32. It supplies 625-line data, normally contained within the 585/60 format, to the vector filter 36. It also supplies data to the delay 42. These data must contain a picture which is the same line standard as the required output, again normally contained within the 585/60 format. Each field of the interpolated data is also made to appear even.

The vector filter 36 produces the filtered picture data required for steps 1 to 5 above of the motion detection. The filtered picture data are supplied in sample reduced form to the vector calculator 37.

The vector calculator 37 operates on the filtered and sample-reduced data from the vector filter 36 using an algorithm described in the terms of the steps 1 to 5 above of the motion detection. The process is essentially a two-dimensional binary search for motion down to pixel/line resolution. For each field, 1200 motion vectors are generated and are supplied to both the modal vector processor 38 and to the sub-pixel motion estimator 39. It also supplies surrounding weighted absolute difference (WAD) values as calculated by step 5 above to the sub-pixel motion estimator 39. For details of WAD calculations, see 'Advances in Picture Coding', Musmann et al, Proceedings of the IEEE, April 1985. The specific WAD value which is the minimum in step 5 above of the motion detection provides a figure of merit (FOM).

The vector processor 38 calculates the four most common motion vectors that are detected in each field and supplies them to the vector reducer 40.

The sub-pixel motion estimator 39 receives the motion vectors from the vector calculator 37 together with the surrounding WAD values. From these it estimates sub-pixel movement to be appended to the motion vector values. With each motion vector its corresponding final WAD value is also supplied to the vector reducer 40.

The vector reducer 40 receives the motion vectors from the vector processor 38 and from the sub-pixel motion estimator 39. For each motion vector from the sub-pixel motion estimator 39, the six motion vectors closest to it are grouped together. For each motion vector there are then eleven choices. The reduction process selects four motion vectors from the eleven for supply to the vector selector 41.

The vector reducer 40 supplies the vector selector 41 with four representative motion vectors for each sixteen pixel by eight line block of the picture. By comparing pixels over three fields, the vector selector 41 selects the single best motion vector for each pixel in the picture. The motion vector selected is supplied to the motion vector filter 47.

The delay 42 delays the data by one frame less twenty-one lines to compensate for other delays in the system.

The temporal shift register 43 holds and supplies the three fields of data used by the vector selector 41.

The motion vector filter 47 tracks a motion vector from one field to another so applying some filtering to the motion vectors by combining motion vectors in different fields, so reducing motion detection errors. The output of the motion vector filter 47 is supplied to the luminance and chrominance interpolators 1Y and 1C to control the alignment of the field data.

Exactly the same hardware can be used as a slow motion processor with good motion portrayal for either a 625/50 or a 525/60 television signal. It is not however necessary to use the vertical interpolator to provide the line number conversion. In all cases the control 32 determines what action is required by recognizing the input/output standard from the input and output field synchronization pulses. In slow motion the input field polarity is used.

Whereas in 50-fields per second to 60-fields per second conversion a field was occasionally repeated, in slow motion the field is repeated the same number of times as the input field is repeated. As repeated fields are not written into the shift registers 16Y and 16C, the shift registers 16Y and 16C again contain distinct consecutive fields. Indeed if a video tape recorder reproduces without any interpolation of its own, the original interlace structure is maintained allowing full resolution pictures to be produced. The temporal offset required is calculated by comparing the actual field rate pulses, be they 50-fields per second or 60-fields per second, with the rate at which a new field is received. To determine the temporal offset in this way, the system needs a signal to be available which indicates the true field polarity of the field being repeatedly replayed. The vertical interpolator will always produce the field polarity required at the output.

Conceptually the TBCs 11Y and 11C are not really required for slow motion operation, but their presence does provide a frame synchronization facility and also simplifies the system configuration.

Figure 3:
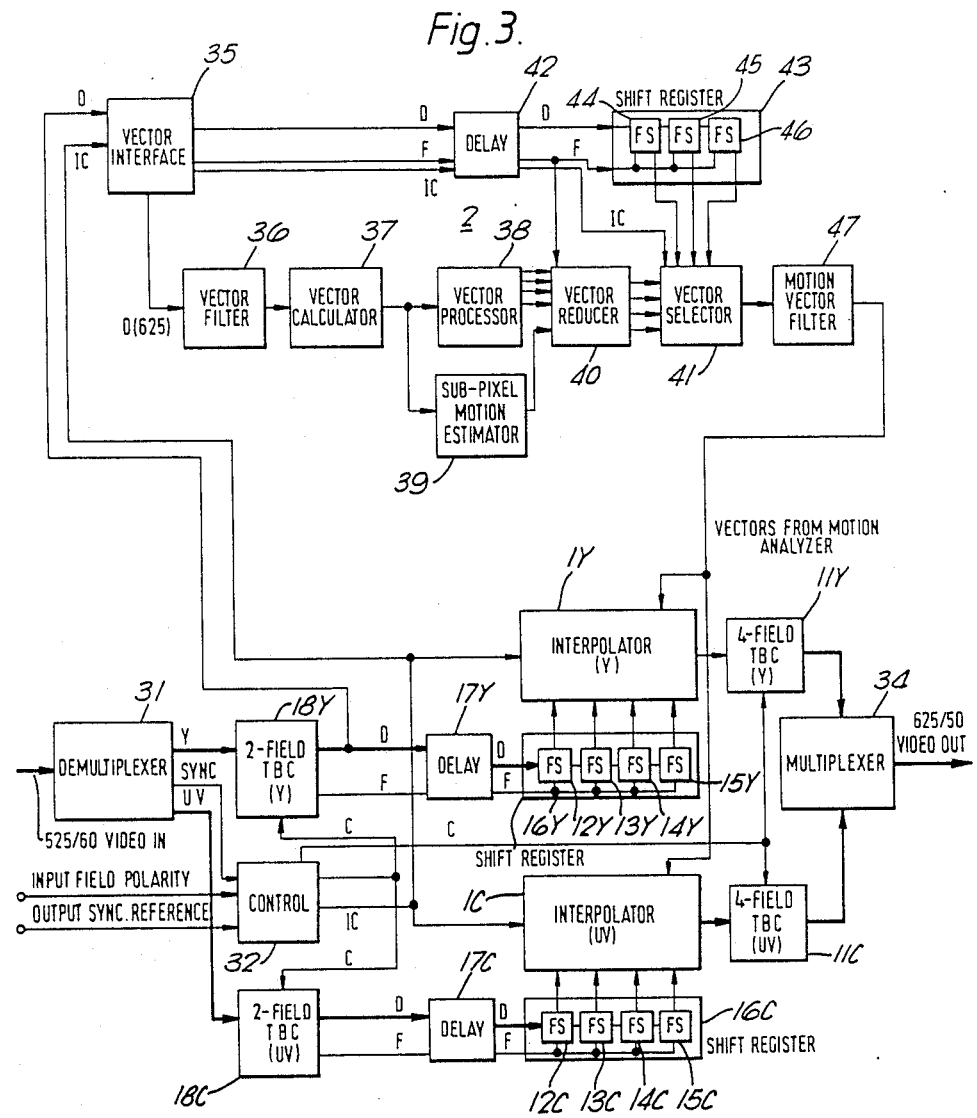
FIG. 3 shows in block diagrammatic form a second television standards converter.

The second standards converter for converting an input digital 525-line 60-fields per second television signal to an output digital 625-line 50-fields per second television signal is shown in detailed block form in FIG. 3.

In this case, interpolation requires that all the input data is available in a consecutive form. In this case it would not therefore be possible to convert to 50-fields per second before the interpolators 1Y and 1C. The input data however contains only 484 active lines and the interplators 1Y and 1C must produce 576. The 2-field TBCs 18Y and 18C are therefore positioned at the front of the standards converter to provide the necessary time slots for 484-line to 576-line conversion.

The original continuous line structure is written into the TBCs 18Y and 18C but is read out in the 585-line standard with approximately every sixth line being blank. The interpolators 1Y and 1C are then used to produce a continuous picture at the output line rate by freezing its line stores during the blank input line, and producing the required additional line at the output, so ensuring that a spatially correct picture is produced. The required temporal offset is detected and applied as in the first standards converter, although the interpolation is applied such that a field can occasionally be dropped leaving the motion smooth. The field is dropped such that 60-fields per second to 50-fields per second conversion is achieved. The dropping of a field is achieved by using the 4-field TBCs 11Y and 11C at the output.

Thus the second standards converter differs from the first standards converter shown in FIG. 2 in only minor respects. In particular, the luminance TBCs 11Y and 18Y are interchanged, and the chrominance TBCs 11C and 18C are also interchanged. Also, no temporal freeze signals are required.

In both cases the control 32 has various functions as follows; controlling the reading and writing of the TBCs 11Y, 11C, 18Y and 18C; generating a temporal offset number, and in the case of the first standards converter the temporal freeze signal, and generating a vertical offset number together with vertical interpolation control signals. These functions will now be described in more detail.

Firstly, the 2-field luminance and chrominance TBCs 18Y and 18C always switch between field stores at the end of every 60 Hz field. However, the operation of the 4-field luminance and chrominance TBCs 11Y and 11C depend on the mode of operation, and their control is also associated with the generation of the temporal offset signal. In fact, the control of the luminance and chrominance TBCs 11Y and 11C is determined from the input and output field synchronizing signals.

The derivation of the temporal offset signal in the case of 525/60 to 625/50 operation will now be described with reference to FIGS. 4 and 5.

In FIG. 4, the control 32 is shown as including a line counter 61, and first and second latches 62 and 63. A line clock signal is supplied to a clock terminal of the line counter 61, while the input field synchronizing signal is supplied to a reset terminal of the line counter 61 and to a clock terminal of the second latch 62. The output field synchronization signal is supplied to a clock terminal of the first latch 62. The output of the line counter 61 is supplied to the input of the first latch 62, the output of which is supplied to the input of the second latch 63, the output of which is the temporal offset signal supplied to the luminance and chrominance shift registers 11Y, 11C, 18Y and 18C.

The input and output field synchronizing signals are shown in FIGS. 5A and 5B respectively. FIG. 5C shows the output of the line counter 61 which repetitively counts from 0 to 524. FIGS. 5D and 5E show the outputs of the first and second latches 62 and 63 respectively. By latching the counter 61, the required proportion of the input field period is determined. The temporal shift value tn indicates the position between two input fields where the output field must be interpolated such that when the shaded field shown in FIG. 5A is dropped, continuous motion still occurs. Thus, the field which uses the temporal offset shown shaded in FIG. 5E is the one that is dropped. It will be seen by reference to FIGS. 5A and 5B, that the field which is dropped is the one which does not have a new temporal shift associated with it. The field (arrowed) which is to be dropped is indicated to the following circuitry by the temporal freeze signal.

The derivation of the temporal offset signal in the case of 625/50 to 525/60 operation will now be described with reference to FIGS. 6 and 7.

In FIG. 6, the control 32 is shown as including a line counter 71 and a latch 72. A line clock signal is supplied to a clock terminal of the line counter 71, while the input field synchronizing signal is supplied to a reset terminal of the line counter 71. The output field synchronization signal is supplied to a clock terminal of the latch 72. The output of the line counter 71 is supplied to the input of the latch 72, the output of which is the temporal offset signal supplied to the luminance and chrominance shift registers 11Y, 11C, 18Y and 18C.

The input and output field synchronizing signals are shown in FIGS. 7A and 7B respectively. FIG. 7C shows the output of the line counter 71 which repetitively counts from 0 to 624. FIG. 7D shows the output of the latch 72. By latching the counter 71, the required proportion of the input field period is determined. Thus, the temporal shift value tn again indicates the position between two input fields where the output field must be interpolated, such that if the shaded field is repeated, continuous motion still occurs. The field which is repeated is the one which has two temporal shift values associated with it. The field (arrowed) which is to be repeated is indicated to the following circuitry by the freeze signal.

The deviation of the temporal offset signal in the case of slow motion whether at 525/60 to 525/60 or 625/50 to 625/50 is the same, and will now be described with reference to FIGS. 8 and 9.

Figure 8:
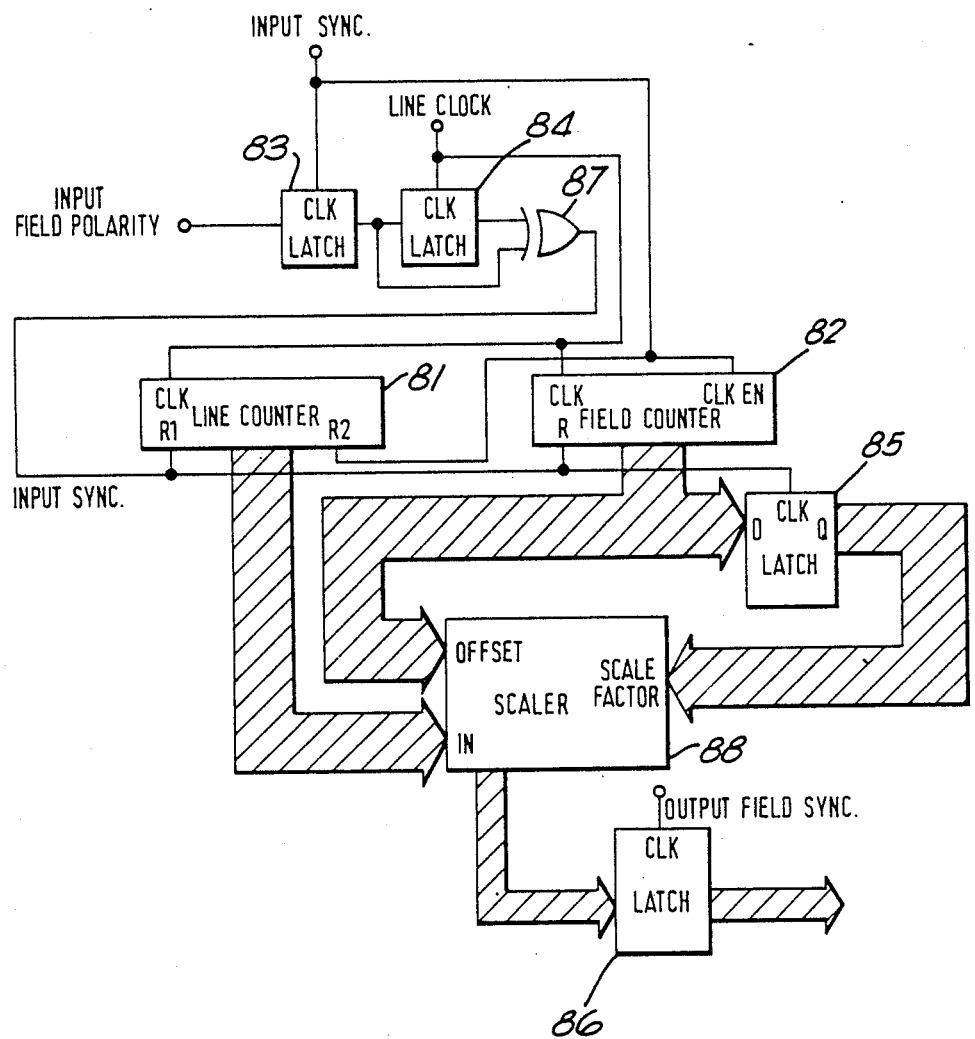
FIG. 8 shows part of the standards converter of FIG. 2 in more detailed block diagrammatic form.

In FIG. 8, the control 32 is shown as including a line counter 81, a field counter 82, first to fourth latches 83 to 86, an exclusive-OR gate 87 and a scaler 88. The input field synchronizing signal is supplied to a clock terminal of the first latch 83, to a clock enable terminal of the field counter 82, and to a second reset terminal of the line counter 81. The input field polarity signal is supplied to the first latch 83 and thence to the second latch 84 and also to one input of the gate 87. The second latch 84 supplies an output to the second input of the gate 87, the output of which is supplied to a first reset terminal of the line counter 81, to a reset terminal of the field counter 82 and to a clock terminal of the third latch 85, which forms a speed detector latch. A line clock signal is supplied to a clock terminal of the second latch 84, and to respective clock terminals of the line counter 81 and the field counter 84. The output of the line counter 81 is supplied to an input terminal of the scaler 88, and the output of the field counter 82 is supplied to an input of the third latch 85 and also to an offset input terminal of the scaler 88. The output field synchronizing signal is supplied to a clock terminal of the fourth latch 86. The output of the third latch 85 is supplied to a scale factor terminal of the scaler 88, the output of which is supplied to the fourth latch 86, the output of which is the temporal offset signal.

Figure 9A:
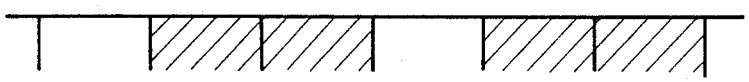
FIG. 9 shows time charts for explaining the operation of FIG. 8.
Figure 9B:
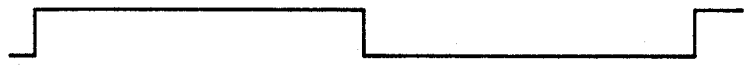
Figure 9C:
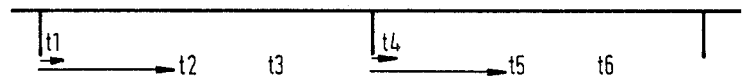
Figure 9E:
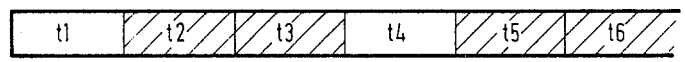
Figure 9G:
Figures 9D, 9F, 9H, 10:
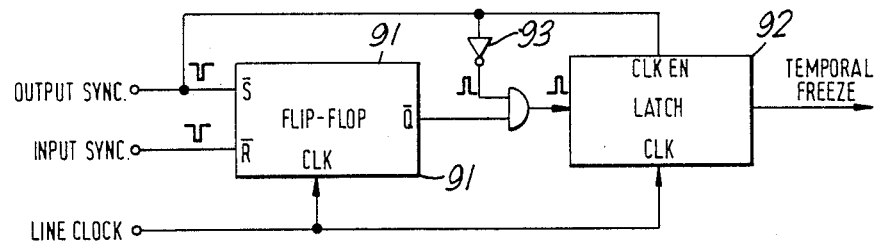
FIG. 10 shows part of the standards converter of FIG. 2 in more detailed block diagrammatic form.

The input field synchronizing signal and the input field polarity signal are shown in FIGS. 9A and 9B respectively. FIG. 9C also indicates the input field synchronizing signals and FIG. 9D the output field synchronizing signals. FIGS. 9E and 9F indicate the operations of the field counter 82 and the line counter 81, which are respectively counting fields and lines from 0 to N. FIG. 9G indicates the output of the fourth latch 86 which is the temporal offset signal. FIG. 9H indicates the temporal freeze signal (which is active when low), and, as indicated by the arrows, the shaded field that uses the temporal offset shown is a repeat of the previous field that used the temporal offset t1.

To generate the temporal freeze signal, the control 32 is shown in FIG. 10 as including a synchronous RS flip-flop 91, a latch 92, an inverter 93 and an AND-gate 94. The output field synchronizing signal is supplied to one input of the flip-flop 91, to the input of the inverter 93 and to a clock enable terminal of the latch 92. The input field synchronizing signal is supplied to the other input of the flip-flop 91, while a line clock signal is supplied to clock terminals of the flip-flop 91 and the latch 92. The output of the flip-flop 91 is supplied to one input of the gate 94, which receives at its other input the output of the inverter 93. The output of the gate 94 is supplied to the input of the latch 92, the output of which forms the temporal freeze signal. The operation of this circuit is such that if more than one output field synchronizing pulse follows an input field synchronizing pulse, a freeze occurs.

Referring back to FIG. 2, the generation of the vertical offset number by the control 32 will now be described. The same address generator which reads data from the luminance TBC 11Y into the luminance interpolator 1Y and the motion analyzer 2, also addresses an erasable programmable read-only memory (EPROM) which provides the vertical offset number together with vertical freeze signals when required.

(In the FIG. 3 arrangement which is used for 525/60 to 625/50, the read addresses of the luminance TBC 18Y are used, but in all other modes the read addresses of the luminance TBC 11Y are used.)

The vertical offset number is generated assuming that both the input and the output fields are even, and it then indicates the position between two input lines where the output line must be interpolated such that a non-distorted picture would be produced if: a line were occasionally dropped in 625/50 to 525/60 conversion, or a line were occasionally repeated in 525/60 to 625/50 conversion.

When a line is repeated by the luminance TBC 11Y (18Y), a vertical freeze signal is generated.

If the input fields are not both even, then the interpolators 1Y and 1C must make use of the input field polarity and output field polarity to ensure correct interpolation.

The contents of the EPROM are generated in a way similar to that described above in connection with FIG. 10 for the temporal offset signal, using the known line position in both a 525 and a 625 picture.

The form and operation of the vector filter 36 and the vector calculator 37, with which the present invention is particularly concerned, will now be described in more detail with reference to FIGS. 11 to 17.

Figure 11:
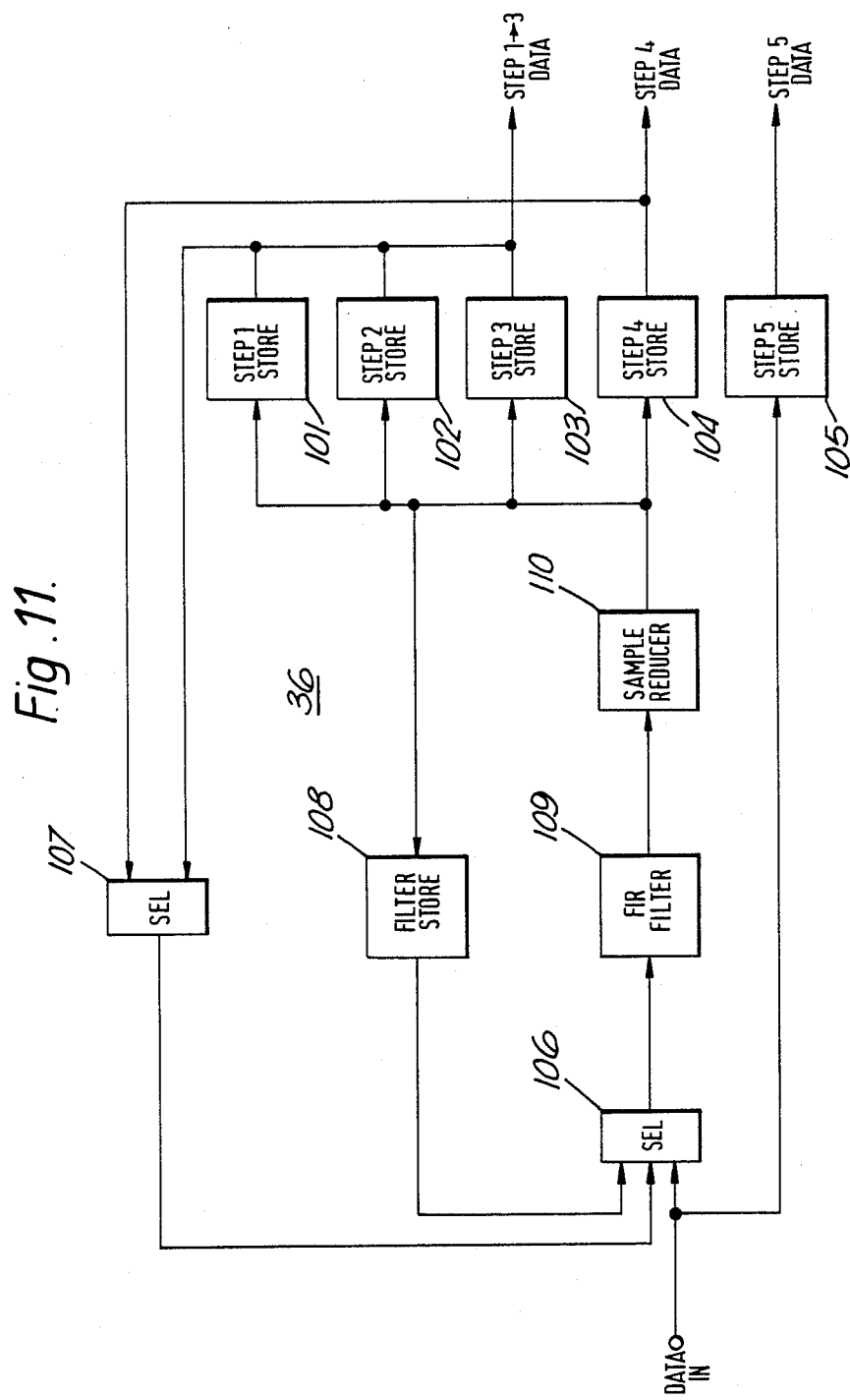
FIG. 11 shows part of the standards converter of FIG. 2 in more detailed block diagrammatic form.

Referring to FIG. 11, which shows the vector filter 36 in block form, it comprises step 1 to step 5 stores 101 to 105, two selectors 106 and 107, a filter store 108, a finite impulse response (FIR) filter 109 and a sample reducer 110 connected as shown. The steps 1 to 5 are those referred to above.

The vector filter 36 receives as its input the data comprising consecutive 625-line fields of the same polarity (in this case even) from the vector interface 35 (FIGS. 2 or 3). As the fields are of the same polarity they are all in the same spatial position. Inherent in the previous process of aligning all fields to the same polarity is a two-dimensional filtering function which means that the data supplied to the vector filter 36 has been sufficiently filtered to be used as the step 5 (or final step) data. This step 5 data is stored in the vector filter 36 while the remaining operation is carried out. This operation is recursive in nature under control of the selectors 106 and 107, in that the previous step's data are filtered in two-dimensions and stored, then the process is repeated on that step data. Due to the amount of filtering involved it is possible to sample reduce the filtered output in both dimensions after each step. Once this process has been carried out four times, the vector filter 36 will then have available at its outputs as indicated the data for steps 1 to 5 of the vector calculation.

The FIR filter 109, the sample reducer 110 and the filter store 108 perform the two-dimensional filtering sample reduction function. A more detailed diagram of this area is shown in FIG. 12.

This part of the vector filter 36 comprises the filter store 108, the FIR filter 109 which is a 7-tap filter, registers (R) 121 and 122, a synchronously loadable register (SLR) 123, selectors 124 and 125, an inverter 126, and row and column address generators 127 and 128.

Figure 12:
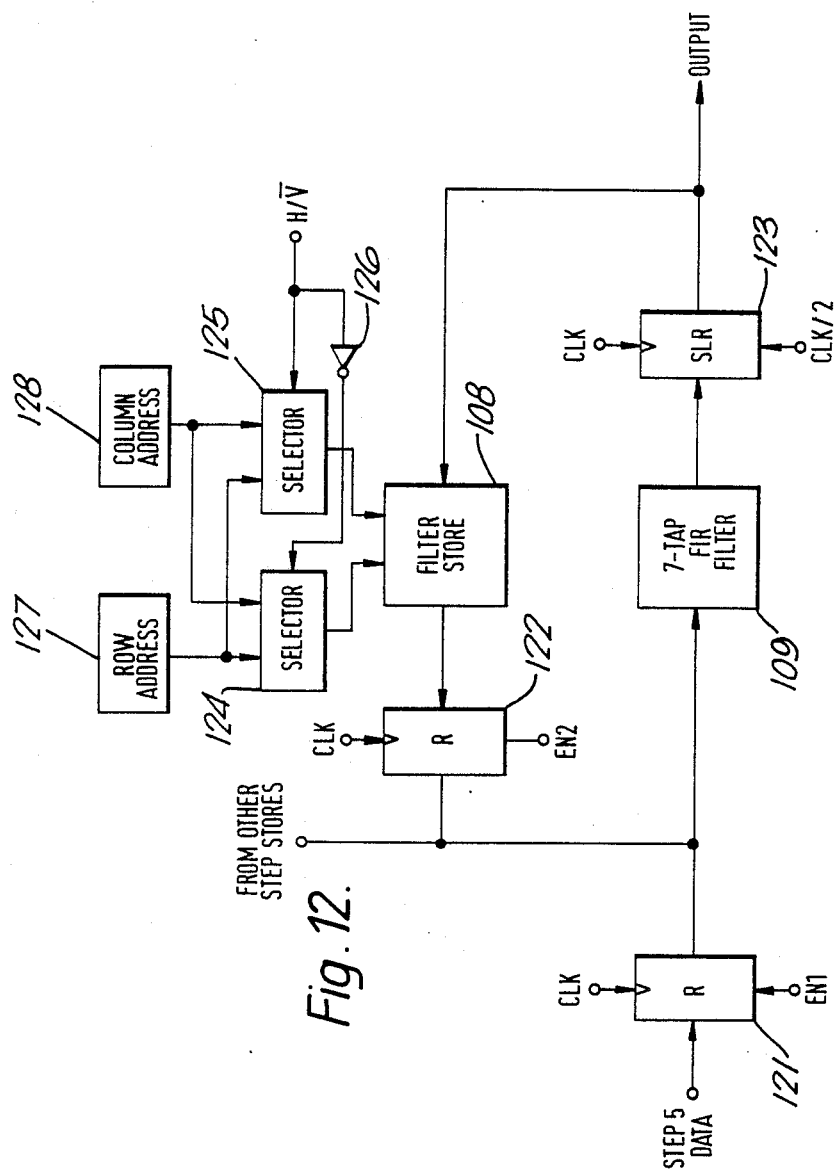
FIG. 12 shows part of FIG. 11 is more detailed block diagrammatic form.
Figure 13:
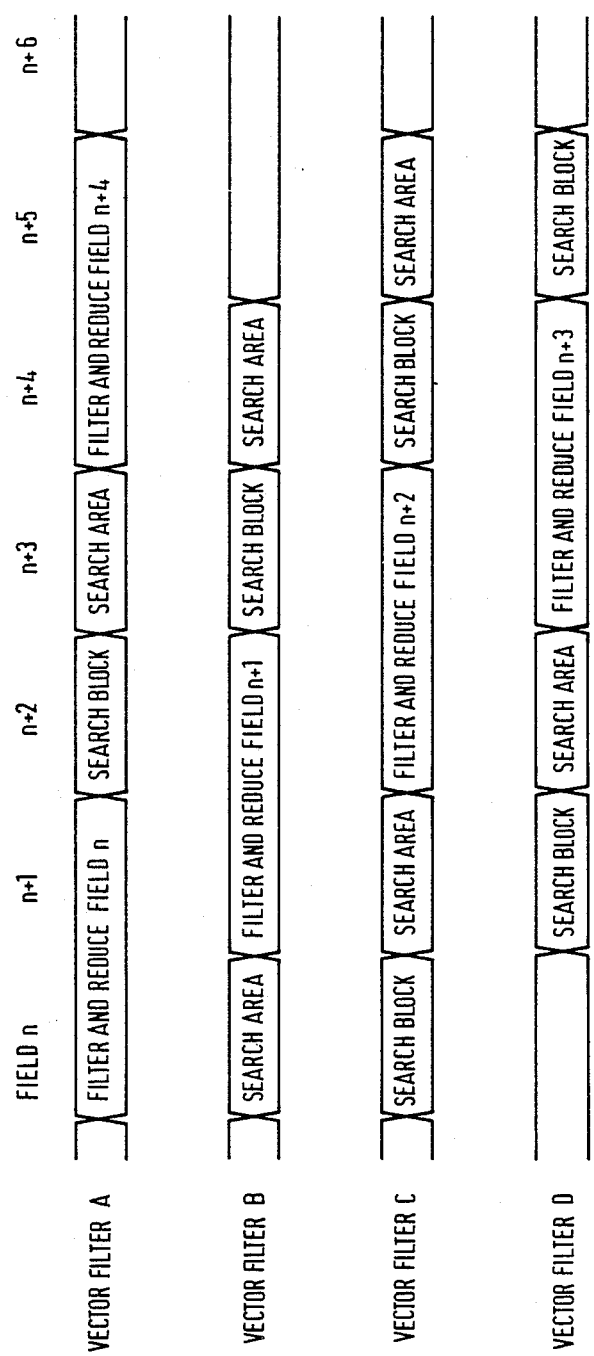
FIG. 13 shows a timing chart for explaining the operation of FIG. 12.

As can be seen from FIG. 12, the two-dimensional filter operation is carried out by a single one-dimensional filter, the reason that this is possible being that the desired two-dimensional response is actually variable separable in form, meaning that a two dimensional convolution in the time domain can be performed as a series of two one-dimensional convolutions. In this particular application, the vertical and horizontal responses are identical and take the form of a cosine-squared or raised cosine function, whose frequency response is such that the filter output will be greater than 48 dB down at the Nyquist frequency, and 6 dB down at half the Nyquist frequency. This response is implemented using the single 7-tap FIR filter 109 which is implemented using two 4-tap FIR filter chips in cascade with an end filter coefficient being set equal to zero. As the filter coefficients do not change at all during operation they could be loaded into the filter chips on switch on, but in practice the circuit is designed such that the coefficients are reloaded every frame, as it is possible to program into a programmable read-only memory (PROM) up to fifteen further sets of coefficients should the need arise, and these can then be selected by a 4-way bit switch mounted on the front of the board.

The operation of this circuit for the input of say step 5 data and producing step 4 data as an output, this output having been two-dimensionally filtered and sample reduced is as follows.

The input in this instance is a normal field of data, and this will be horizontally filtered by the 7-tap FIR filter 109 operating at full clock rate. The output of the FIR filter 109 is fed to the SLR 123 which is controlled by a half clock rate signal, the effect of which is to miss out every other sample thus reducing the filtered output horizontally by a factor of two.

Horizontally filtered and reduced data from the SLR 123 is written into the filter store 108 row by row. Once this process has been performed over the whole field, the filter store 108 will contain a field consisting of the correct number of lines, but which has been reduced in size horizontally by two. Incidentally, because the filter response is such that its output is greater than 48 dB down at the Nyquist frequency, then when the sample reduction takes place, there will be an absence of any alias frequency components in the SLR output.

The row and column addresses to the filter store 108 are now switched over such that the data is read out from the filter store 108 column by column, and fed back into the FIR filter 109 and sample reducer (SLR 123), the output of which is the original input data reduced by a factor of two in both the vertical and horizontal directions, which in this instance would be the step 4 data and as such is written into the step 4 store.

The process is then repeated to obtain the step 3 data by reading the step 4 store 104 (FIG. 11), and feeding this data into the FIR filter 109 and eventually into the step 3 store 103 (FIG. 11), likewise to obtain the step 2 data from the step 3 data. Obtaining the step 1 data from the step 2 is slightly different in that the filtration and sample reduction process is only carried out horizontally. This is because the first step of the motion vector estimation process looks for horizontal movement (of sixteen pixels) only, and the next step, step 2, then refines the estimate found in step 1 by looking for motion in steps of eight pixels/lines from the position indicated by step 1.

In FIG. 11, the step 5 store 105 is a field store, the step 4 store 104 is a half field store, the step 3 store 103 is a quarter field store, the step 2 store 102 is an eighth field store, and the step 1 store 101 is a sixteenth field store.

In practice, steps 1, 2 and 3 are all stored in the same random access memory (RAM), with steps 4 and 5 being stored in independent RAMs.

The complete process in determining the step 1 to 5 data takes two field periods, and it is then necessary to hold this data for two further field periods as it is required to be used as search block data on one field search area data on the next. Thus, there is a necessary requirement for four such vector filter boards in the motion vector estimation system, and this is illustrated by the simple timing diagram shown in FIG. 13. From FIG. 13 it can be seen that vector filters A and C can have their outputs multiplexed together, and the same holds for vector filters B and D, this means that the vector calculators will have available to them on two separate inputs continuous search block/area data.

Figure 14:
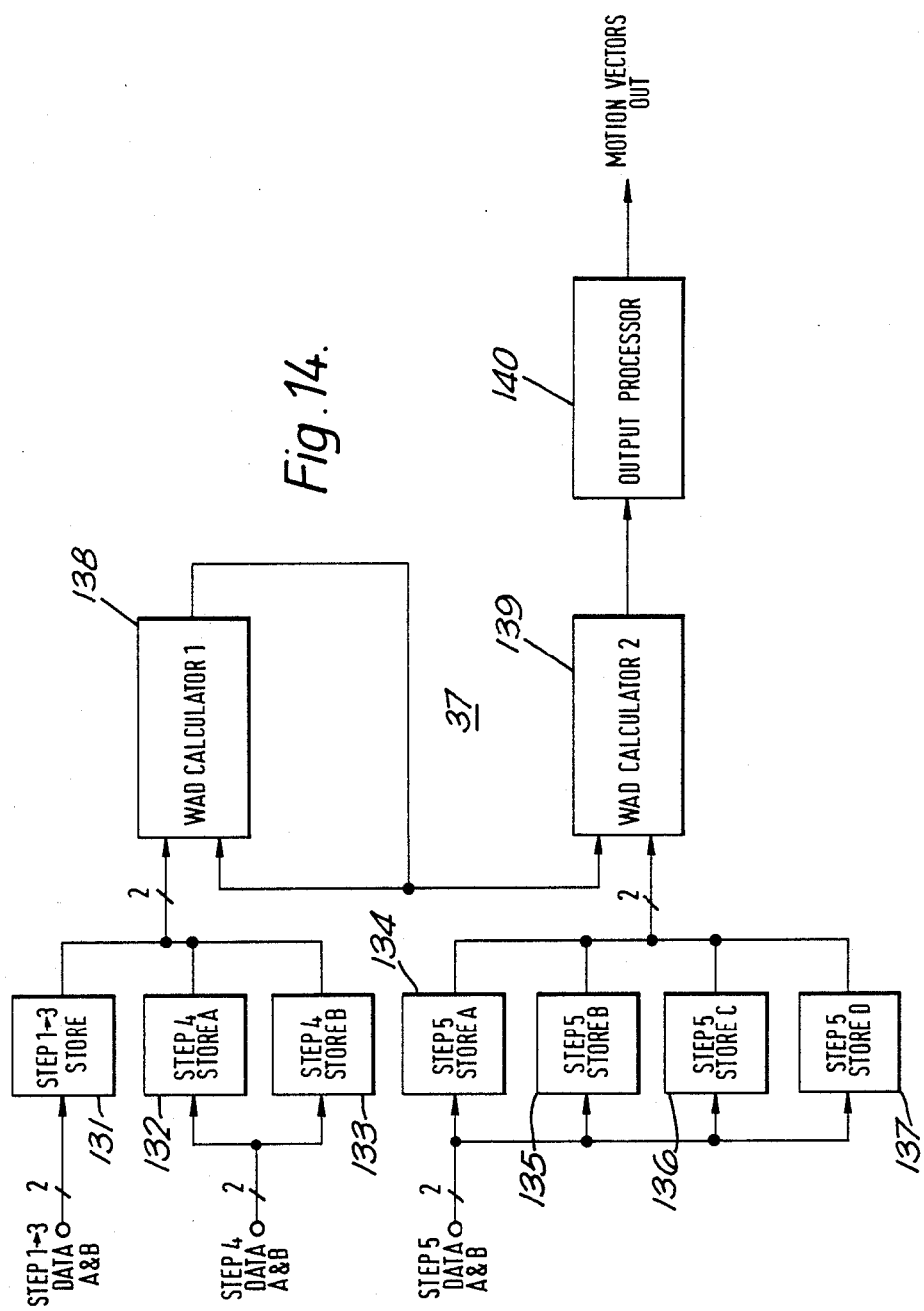
FIG. 14 shows part of the standards converter of FIG. 2 in more detailed block diagrammatic form.

Referring to FIG. 14, which shows the vector calculator 37 in block form, it comprises a step 1 to 3 store 131, A and B step 4 stores 132 and 133, A to D step 5 stores 134, 135, 136 and 137, two weighted absolute difference (WAD) calculators 138 and 139, and an output processor 140 connected as shown, and receiving inputs as shown.

An array of thirty vertical by forty horizontal motion vectors per field are calculated every field, and to enable this to occur in real time using a reasonable amount of hardware, it is necessary to have such ten vector calculator boards as depicted in FIG. 14. Using this arrangement means that the motion vectors are calculated in four blocks of thirty vertically by ten horizontally.

The data from the vector filters 36 (FIG. 11) are provided as a continuous stream of data for each of steps 1 to 3, step 4 and step 5, and it is left to each of the vector calculators 37 to determine which data it requires in the calculation of each step.

Figure 15:
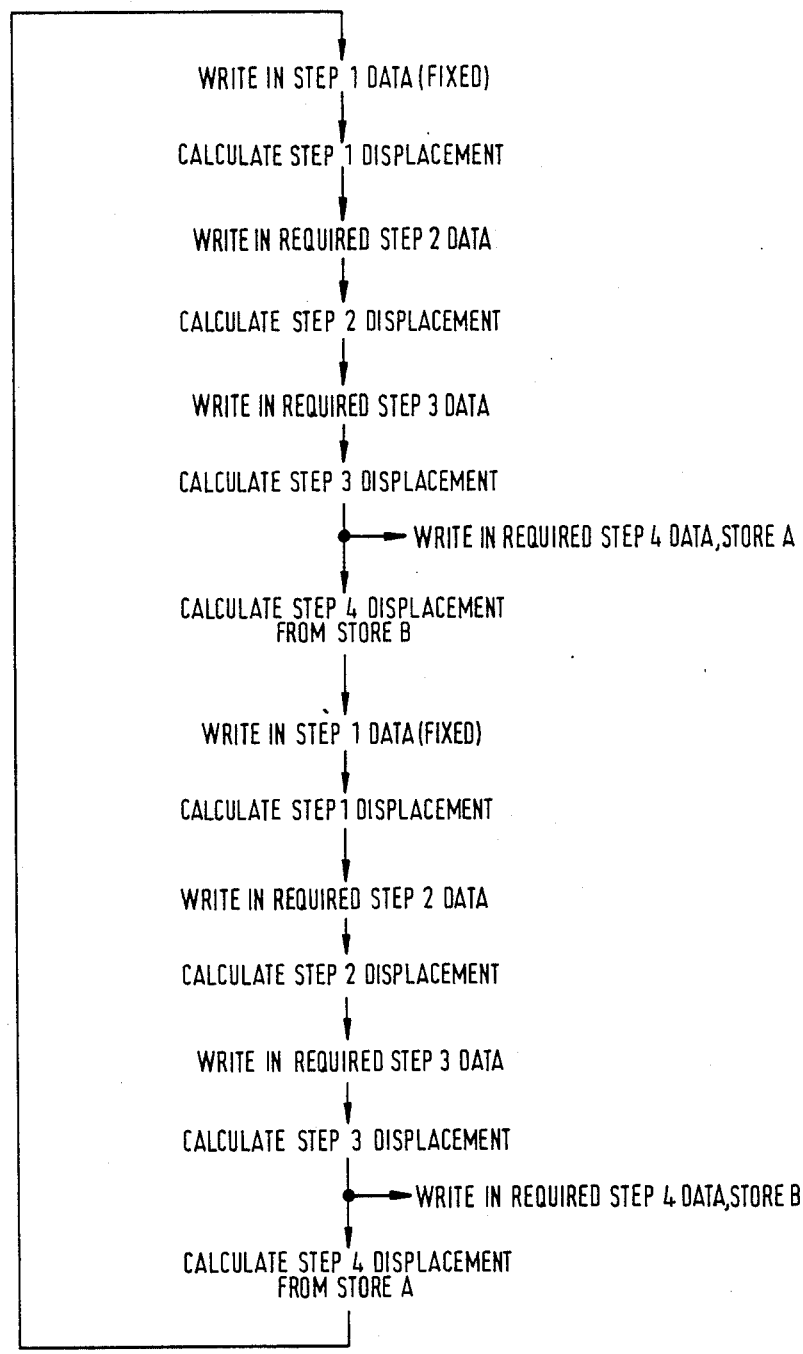
FIG. 15 shows a flow chart for explaining the operation of FIG. 14.

The simplified flow chart given in FIG. 15 shows the operation of the step 1 to 3 store 131, the step 4 stores 132 and 133, and the first WAD calculator 138. Being the starting point, the step 1 data is always in a fixed and known position, the search block will be one pixel the search area three horizontal pixels, with the resulting vector from this calculation being either zero or ±16 horizontal. The vertical component of the vector is always zero. In order to determine where the search area is to be written into the next step store, the vertical and horizontal addresses, which count to a maximum that the search area could have moved to, determined by the previous step, are fed into vertical and horizontal PROMs along with the previous vertical and horizontal motion vector components from the first WAD calculator 138. The PROMs are effectively mapping the output address to the step stores by combining the motion vector components with the input addresses.

With reference to FIG. 15, each time a step 4 displacement is calculated, its value is passed to one of the four step 5 stores 134 to 137 (FIG. 14) which are necessary in order continuously to calculate the final step 5 outputs.

The function of the first WAD calculator 138 is to calculate and determine which of the nine motion vectors is the minimum, and then correspondingly modify the vertical and horizontal motion vector components.

Figure 16:
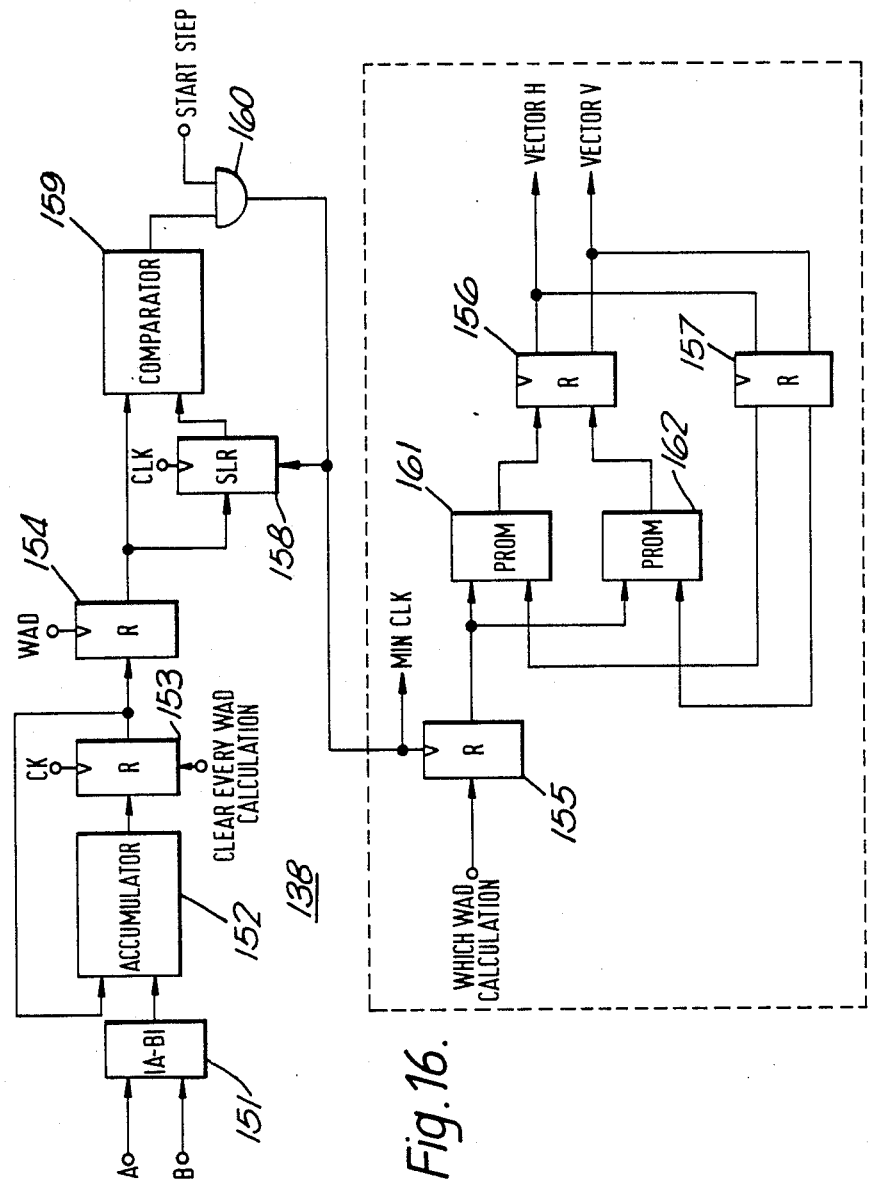
FIG. 16 shows part of FIG. 14 in more detailed block diagrammatic form.

FIG. 16 shows the first WAD calculator 138 in more detail. It comprises a modular subtractor 151, an accumulator 152, five registers 153, 154, 155, 156 and 157, an SLR 158, a comparator 159, an AND-gate 160, and two PROMs 161 and 162 connected and receiving inputs as shown.

The A and B inputs are the search block and search area data from the step stores. The first subtractor 151 will calculate the absolute difference between the single pixel values on its two inputs. The output is one of two inputs to the accumulator 152, the other input being the accumulator output delayed by one clock. Therefore, the function of the accumulator 152 is to calculate the WAD values for the nine positions on the first four steps. The nine WAD values are successively clocked, as they are calculated, to the comparator 159 which determines the minimum WAD value for each step by enabling the SLR 158 when a minimum is detected. At the start of each step the first WAD value is forced into the SLR 158.

At the same time the 'minimum detected' signal also clocks the register 155 which will then hold the number of the minimum WAD calculation. This number is then fed to the PROM 161 at the end of each step, along with the vertical and horizontal motion vector components from the previous step in order to determine the resultant motion vector.

Figure 17:
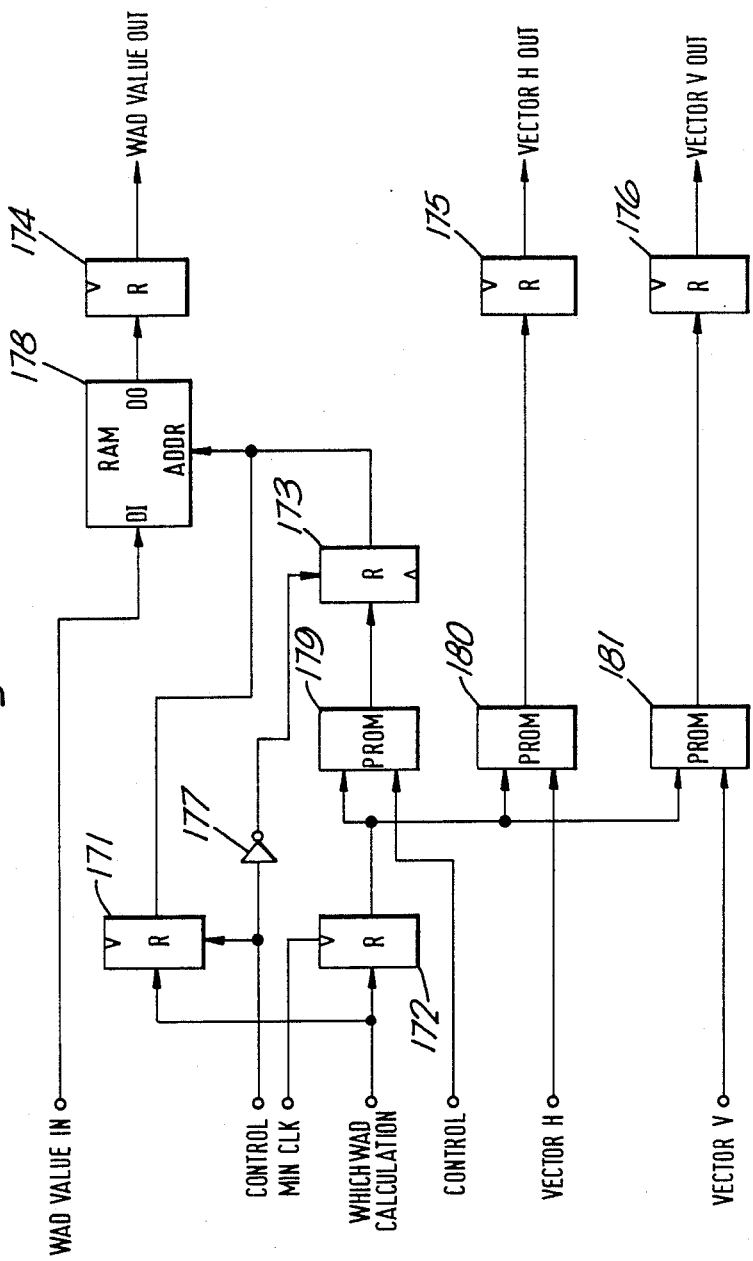
FIG. 17 shows part of the standards converter of FIG. 2 in more detailed block diagrammatic form.

The second WAD calculator 139 (FIG. 14) is virtually identical to the first WAD calculator 138 (FIGS. 14 and 16) but it does not contain the circuitry enclosed by the dotted line in FIG. 16, this function being incorporated into the output processor (FIG. 17). Also the second WAD calculator 139 is only required to calculate step 5 whereas the first WAD calculator 138 calculates steps 1, 2, 3 and 4, and for this reason there are a number of control lines which have been missed out of FIG. 16 for simplicity.

FIG. 17 to which reference is now made shows the output processor referred to above. It comprises six registers 171, 172, 173, 174, 175 and 176, an inverter 177, a RAM 178, and three PROMs 179, 180 and 181 connected and receiving inputs as shown.

The output processor of FIG. 17 not only modifies the motion vector determined by step 4 such that the motion vector is now calculated to pixel resolution again dependent upon which of the nine WAD calculations was a minimum, but it also stores this WAD value as the figure of merit (FOM) used by the motion vector reduction circuitry. In fact all WAD values are stored in the RAM 178, as once the minimum has been determined it is then the decision of the output processor as to which other four WAD values are necessary in order for the next circuit, which is the vector processor 38 (FIGS. 2 and 3), to calculate any sub-pixel movement. To this end it may be necessary for the second WAD calculator 139 (FIG. 11) to determine up to two further WAD values as the sub-pixel processor requires the WAD values directly above, below, to the left and to the right of the minimum. Thus, if the minimum were at any other than the centre position this would be the case.

Finally, it is now possible to supply the motion vector, calculated to pixel resolution, along with its FOM and four other WAD values necessary for determining any sub-pixel movement to the vector processor 38 and the sub-pixel motion estimator 39 (FIGS. 2 and 3) for further processing as described above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of motion vector estimation in a television image comprising using a digitized signal for representing said image, and using a block matching technique with successive refinement of the motion vector estimate and in which motion in said image at points spaced a predetermined number of samples horizontally and a predetermined number of samples vertically is determined by the block matching technique.

2. A method according to claim 1 wherein said block matching technique comprises the steps of:
   testing for minimum difference in three positions, the centre position of a block, a predetermined number of samples to the left, and the same predetermined number of samples to the right;
   starting from the point indicated above, testing for minimum difference in nine positions symmetrically distributed about the above starting point in steps of a smaller predetermined number of samples or lines;
   starting from the point indicated above, testing for minimum difference in nine positions symmetrically distributed about the above starting point in steps of a still smaller predetermined number of samples or lines;
   starting from the point indicated above, testing for minimum difference in nine positions symmetrically distributed about the above starting point in steps of a still smaller predetermined number of samples or lines; and
   starting from the point indicated above, testing for minimum difference in nine positions symmetrically distributed about the above starting point in steps of one sample or line.

3. A method according to claim 2 comprising a further step, subsequent to the last step of claim 2, of comparing the difference produced at the final position indicated by said last step with the two difference above and below to adjust the vertical vector value, and with the two differences to the left and right to adjust the horizontal vector value.

4. Apparatus for motion vector estimation in a television image using a block matching technique with successive refinement of the motion vector estimate, the apparatus comprising a vector filter and a vector calculator.

5. Apparatus according to claim 4 wherein said vector calculator is arranged to perform the following steps on a digitized signal representing said image and supplied to said vector calculator by said vector filter;
   testing for minimum difference in three positions, the centre position of a block, a predetermined number of samples to the left, and the same predetermined number of samples to the right;
   starting from the point indicated above, testing for minimum difference in nine positions symmetrically distributed about the above starting point in steps of a smaller predetermined number of samples or lines;
   starting from the point indicated above, testing for minimum difference in nine positions symmetrically distributed about the above starting point in steps of a still smaller predetermined number of samples or lines;
   starting from the point indicated above, testing for minimum difference in nine positions symmetrically distributed about the above starting point in steps of a still smaller predetermined number of samples or lines; and
   starting from the point indicated above, testing for minimum difference in nine positions symmetrically distributed about the above starting point in steps of one sample or line.

6. Apparatus according to claim 5 wherein said vector calculator is arranged to perform a further step, subsequent to the last step of claim 5, of comparing the difference produced at the final position indicated by said last step with the two differences above and below to adjust the vertical vector value, and with the two differences to the left and right to adjust the horizontal vector value.

7. A television standards converter comprising:
   means comprising apparatus according to claim 4 for analyzing the motion between consecutive fields of an input television signal of one television standard;
   means then to align said fields so as effectively to represent static pictures; and
   means to effect conversion using said static pictures to derive the required output television signal of a different television standard.

8. A television standards converter according to claim 7 wherein said means to align said fields operates to vary the address of a variable delay element to reposition each pixel of the picture to the nearest line or sample, and then reposition each pixel of the picture both vertically and horizontally to a fraction of a line and a fraction of a sample respectively.

9. A television standards converter according to claim 8 wherein said vertical repositioning to a fraction of a line is done by a vertical interpolator with four taps per field, and said horizontal repositioning to a fraction of a sample is done by a horizontal filter having two or four taps.

10. A television standards converter according to claim 7 wherein said means to effect conversion comprises an interpolator for effecting vertical/temporal interpolation, and said input television signal is supplied to said interpolator by way of a time base corrector which produces therefrom a 585-line 60-fields per second television signal.

11. A television standards converter according to claim 10 wherein said input television signal is a 625-line 50-fields per second signal, said time base corrector is a 4-field time base corrector, and the output of said time base corrector is supplied to said interpolator by way of a 4-field shift register.

12. A television standards converter according to claim 10 wherein said input television signal is a 525-line 60-fields per second signal, said time base corrector is a 2-field time base corrector, and the output of said time base corrector is supplied to said interpolator by way of a 4-field shift register.

13. A 625-line 50-fields per second to 525-line 60-fields per second television standards converter comprising:
   a 4-field time base corrector for receiving an input 625-line 50-fields per second digital television signal;
   a motion analyzer comprising apparatus according to claim 5 connected to the output of said time base corrector for analyzing motion in said input television signal;

a shift register also connected to the output of said time base corrector;

an interpolator for deriving samples of a required output 525-line 60-fields per second digital television signal in dependence on samples derived from said shift register and picture motion data derived by said motion analyzer; and a 2-field time base corrector for assembling said derived samples to form said output television signal.

14. A television standards converter according to claim 13 wherein said 4-field time base corrector derives a 585-line 60-fields per second television signal from said input television signal for supply to said shift register.

15. A time base corrector according to claim 14 wherein said motion analyzer derives motion vectors in dependence on the motion between corresponding pixels in consecutive fields of said input television signal, and supplies said motion vectors to said interpolator so as effectively to align said pixels in said consecutive fields to represent static pictures.

16. A 525-line 60-fields per second to 625-line 50-fields per second television standards converter comprising:

a 2-field time base converter for receiving an input 525-line 60-fields per second digital television signal;

a motion analyzer comprising apparatus according to claim 5 connected to the output of said time base corrector for analyzing motion in said input television signal;

a shift register also connected to the output of said time base corrector;

an interpolator for deriving samples of a required output 625-line 50-fields per second digital television signal in dependence on samples derived from said shift register and picture motion data derived by said motion analyzer; and a 4-field time base corrector for assembling said derived samples to form said output television signal.

17. A television standards converter according to claim 16 wherein said 2-field time base corrector derives a 585-line 60-fields per second television signal from said input television signal for supply to said shift register.

18. A time base corrector according to claim 17 wherein said motion analyzer derives motion vectors in dependence on the motion between corresponding pixels in consecutive fields of said input television signal, and supplies said motion vectors to said interpolator so as effectively to align said pixels in said consecutive fields to represent static pictures.

19. A slow motion processor comprising:

an input circuit for receiving an input digital television signal;

a motion analyzer comprising apparatus according to claim 4 for analyzing motion in said input digital television signal;

a shift register for holding successive different fields of said input television signal;

an interpolator for deriving samples of a required slow motion output digital television signal in dependence on the degree of slow motion, samples derived from said shift register, and picture motion data derived by said motion analyzer; and a 2-field time base corrector for assembling said derived samples to form said slow motion output television signal.

20. A slow motion processor according to claim 19 wherein said input circuit is a 4-field time base corrector.

21. A slow motion processor according to claim 20 wherein said 4-field time base corrector derives a 585-line 60-fields per second television signal from said input television signal for supply to said shift register.

* * * * *